(No Model.)
L. GUINNIP.
Horse Collar.
No. 238,499. Patented March 8, 1881.
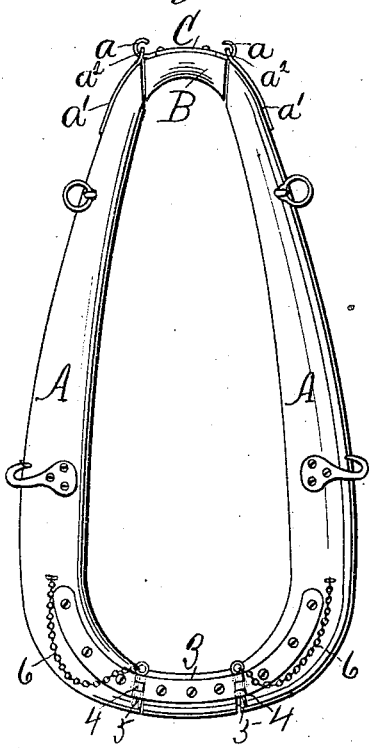
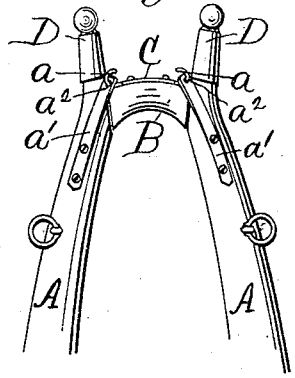
Witnesses:
F. B. Townsend
W. A. Schonfeld
Inventor:
Lyman Guinnip,
per L. B. Coupland &Co.,
Attorneys.

UNITED STATES PATENT OFFICE.

LYMAN GUINNIP, OF CHICAGO, ILLINOIS.

HORSE-COLLAR.

SPECIFICATION forming part of Letters Patent No. 238,499, dated March 8, 1881.

Application filed July 20, 1880. (No model.)

*To all whom it may concern:*

Be it known that I, LYMAN GUINNIP, of Chicago, in the county of Cook and State of Illinois, have invented certain new and useful Improvements in Horse-Collars; and I do hereby declare the following to be a full, clear, and exact description of the invention, that will enable others skilled in the art to which it appertains to construct and make use of the same, reference being had to the accompanying drawings, and to letters and figures of reference marked thereon, forming a part of this specification.

The object of this invention is an improvement on Letters Patent No. 222,364, issued December 9, 1879.

The nature of this invention relates to certain novel features or improvements in wooden horse-collars, whereby the several parts are so constructed and arranged as to adapt the collar to readily adjust itself to the movements of the horse, the exact construction and operation of which will be hereinafter more fully described in detail, and set forth in the claims.

Figure 1 is a front elevation of a horse-collar embodying my improvements; Fig. 2, a view of the upper half of a collar provided with a hame-extension formed integral therewith.

Referring to the drawings, A represents the collar proper, composed of wood and formed in two distinct sections or halves, the upper ends of the collar being connected and made continuous by means of the arched neck-piece B. The neck-piece or block B is interposed between the upper ends of the collar in the manner shown in Fig. 1 of the drawings, and attached thereto by means of the metallic strap C, placed upon the upper side of the independent piece B, having the ends bent around to form the hooks $a$, and the metallic straps $a'$ rigidly attached to the edges of the collar, and having the eyes $a^2$ formed on the upper projecting ends thereof, thereby adapting the same to engage with the hooks $a$, as shown in Fig. 1 of the drawings. This form of construction and arrangement of these parts causes the same to partake of something of the nature and actions of a universal joint, thereby adapting the collar to conform to the movements of the animal when in the act of stepping, which requires a lateral adjustment and a rolling adjustment of the arched neck-piece when the head of the animal is moved up or down.

The form of attaching the independent neck-piece to the upper ends of the collar proper, as shown and described in a former patent herein referred to, was found to be defective in practical operation, from the fact that provision was only made for a lateral adjustment of the collar proper relative to a forward movement of the animal, and would not impart a rolling motion to the neck-piece inserted between the ends of the collar as the head of the animal was thrown up or down.

As shown in Fig. 2 of the drawings, the collar is constructed with a hame-projection, D, forming what is known as a "high-top collar," instead of a round top. This hame-projection is formed integral with the collar proper, and serves as a mere matter of ornament and difference in taste. In constructing this style of collar the metallic straps $a'$ are placed upon the face of the collar, the upper ends provided with the eyes $a^2$ being bent at right angles, and pass around the inside of the hame-projections and engage with the hooks $a$.

The arrangement and action of the arched neck-piece B is such that it keeps the collar and parts from having an unequal or severe pressure on the cords leading to the head, which pressure, by the old solid style of collar, often heats and galls the top of the neck, and in some cases is the real cause of blindness.

The lower connecting part or independent block, 3, inserted between the lower ends of the collar, is secured in place by means of the hinged joints 4, the form of construction and operation being precisely the same as that already shown and described in connection with a former patent herein referred to, with this difference: the locking and bearing pins 5, forming the hinged joints 4, are split, so as to form a spring-key, preventing the same from working out, as was found to be the case with the solid pin used in a former patent. The chains 6 secure the locking-keys to the collar when the parts are disconnected.

This form of construction and arrangement of the several parts composing the collar adapts the same to properly adjust itself to all the movements of the animal, and at the same time retain its place and bearing on the muscular part of the shoulder, and by an oscillating action equalizes the draft-strain and prevents the load from being alternately thrown from one shoulder to the other. Being hinged at both top and bottom, bearing on the muscular part of the shoulder and yielding with the step, the animal is enabled to draw a much heavier load, for the reason that the collar gives an equal pressure along the whole line of draft, whereas the solid collar alternately shifts the load from one shoulder to the other.

The abutting ends of the collar and the interposed parts are covered with a facing of rubber or other suitable elastic material, for the purpose of imparting additional flexibility to these parts.

By interposing larger or smaller blocks between the ends of the collar the size of the same may be varied to any degree circumstances may require.

The upper connecting-block may be composed of any material suitable for the purpose, wood being preferably used.

Having thus described my invention, what I claim, and desire to secure by Letters Patent, is—

1. In a horse-collar, the combination, with the two sections A, forming the collar proper, of the arched neck-piece B, the metallic strap C, having the hooks $a$ formed integral therewith, and the metallic straps $a'$, provided with the eyes $a^2$, adapting the same to engage with the hooks $a$, substantially as and for the purpose herein described.

2. In a horse-collar of the character hereinbefore described, the combination of the following elements, consisting of the two sections A, the arched neck-piece B, the metallic strap C, provided with the hooks $a$, the metallic straps $a'$, having the eyes $a^2$, the lower interposed part or block, 3, and the locking spring-keys 5, all constructed and arranged as herein shown, and for the purposes set forth.

LYMAN GUINNIP.

Witnesses:
L. A. BUNTING,
L. B. COUPLAND.